United States Patent
Ito et al.

(10) Patent No.: US 10,907,911 B2
(45) Date of Patent: *Feb. 2, 2021

(54) DEHUMIDIFIER

(71) Applicant: Mitsubishi Electric Corporation, Tokyo (JP)

(72) Inventors: Shinichi Ito, Tokyo (JP); Fumitake Unezaki, Tokyo (JP); Mamoru Hamada, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 1088 days.

This patent is subject to a terminal disclaimer.

(21) Appl. No.: 14/781,626

(22) PCT Filed: Apr. 24, 2013

(86) PCT No.: PCT/JP2013/062128
§ 371 (c)(1),
(2) Date: Oct. 1, 2015

(87) PCT Pub. No.: WO2014/174623
PCT Pub. Date: Oct. 30, 2014

(65) Prior Publication Data
US 2016/0061475 A1    Mar. 3, 2016

(51) Int. Cl.
*F28F 1/12* (2006.01)
*B01D 53/04* (2006.01)
(Continued)

(52) U.S. Cl.
CPC .......... *F28F 1/126* (2013.01); *B01D 53/0438* (2013.01); *B01D 53/261* (2013.01);
(Continued)

(58) Field of Classification Search
CPC ........ F25D 17/042; F25D 21/02; F25D 21/14; B01D 53/261; B01D 53/0438; F24F 3/14;
(Continued)

(56) References Cited

U.S. PATENT DOCUMENTS 2,871,680 A * 2/1959 Zearfoss, Jr. ........... F25B 45/00
62/513
3,274,797 A * 9/1966 Kritzer .................... F25B 39/00
62/511
(Continued)

FOREIGN PATENT DOCUMENTS

CA         2722405 A1    10/2011
CN       201126243 Y  * 10/2008
(Continued)

OTHER PUBLICATIONS

Kinai, Deodorization Apparatus, Jul. 3, 2008, JP2008148832A, Whole Document.*
(Continued)

*Primary Examiner* — Larry L Furdge
(74) *Attorney, Agent, or Firm* — Posz Law Group, PLC

(57) ABSTRACT

A first heat exchanger, a desiccant block, and a second heat exchanger are arranged in series. Further, in a dehumidifying operation, a first operation mode and a second operation mode are alternately repeated. In the first operation mode, the first heat exchanger is operated as a condensor or a radiator and the second heat exchanger is operated as an evaporator. In the second operation mode, the first heat exchanger is operated as the evaporator and the second heat exchanger is operated as the condensor or the radiator. Further, an interval between fin surfaces of a plurality of fins in each of the first heat exchanger and the second heat exchanger is set to 1.5 mm to 3.0 mm so that drainage performance for dew condensation on the fin surfaces is enhanced to reduce an amount of the dew condensation stagnating on the fin surfaces and increase a dehumidifying amount.

10 Claims, 7 Drawing Sheets

(51) Int. Cl.
*B01D 53/26* (2006.01)
*F24F 3/153* (2006.01)
*F24F 3/14* (2006.01)
*F24F 11/30* (2018.01)
*F25D 21/02* (2006.01)
*F25D 21/14* (2006.01)
*F24F 110/20* (2018.01)
*F24F 11/65* (2018.01)

(52) U.S. Cl.
CPC ............ *F24F 3/14* (2013.01); *F24F 3/1411* (2013.01); *F24F 3/153* (2013.01); *F24F 11/30* (2018.01); *F25D 21/02* (2013.01); *F25D 21/14* (2013.01); *F24F 11/65* (2018.01); *F24F 2003/144* (2013.01); *F24F 2003/1446* (2013.01); *F24F 2110/20* (2018.01)

(58) Field of Classification Search
CPC .......... F24F 11/65; F24F 11/30; F24F 3/1411; F24F 3/153; F24F 2110/20; F24F 2003/144; F24F 2003/1446; F28F 1/126
See application file for complete search history.

(56) References Cited

U.S. PATENT DOCUMENTS

| | | | | |
|---|---|---|---|---|
| 4,420,943 A * | 12/1983 | Clawson | ............... | F25B 47/022 62/149 |
| 4,995,453 A * | 2/1991 | Bartlett | ................... | F25B 39/00 165/150 |
| 5,157,941 A * | 10/1992 | Cur | ......................... | F25B 39/02 165/146 |
| 5,540,276 A * | 7/1996 | Adams | .................. | F28D 1/0477 165/150 |
| 5,704,217 A * | 1/1998 | Itoh | ...................... | B60H 1/3207 236/49.3 |
| 5,953,926 A | 9/1999 | Dressler et al. | | |
| 6,253,839 B1 * | 7/2001 | Reagen | .................. | F25B 39/02 165/151 |
| 6,477,848 B1 * | 11/2002 | Domyo | ................... | F25B 13/00 252/68 |
| 7,984,619 B2 * | 7/2011 | Matsui | .................. | F24F 3/1411 62/271 |
| 2007/0193287 A1 * | 8/2007 | Ishida | ................... | F24F 3/1411 62/176.1 |
| 2009/0126397 A1 * | 5/2009 | Sueoka | ............... | B01D 53/261 62/476 |
| 2011/0239663 A1 | 10/2011 | Matsui | | |
| 2014/0250930 A1 | 9/2014 | Unezaki et al. | | |

FOREIGN PATENT DOCUMENTS

| | | | |
|---|---|---|---|
| CN | 103889550 A | | 6/2014 |
| EP | 2772298 A1 | | 9/2014 |
| GB | 2272845 A | * | 6/1994 |
| JP | H02197796 A | * | 8/1990 |
| JP | 04-015492 A | | 1/1992 |
| JP | 10-096599 A | | 4/1998 |
| JP | 2001208393 A | * | 8/2001 |
| JP | 2003-227626 A | | 8/2003 |
| JP | 2006-150305 A | | 6/2006 |
| JP | 2008-148832 A | | 7/2008 |
| JP | 2008148832 A | * | 7/2008 |
| JP | 2011-082761 A | | 4/2011 |
| JP | 2012-127630 A | | 7/2012 |
| JP | 5452565 B2 | | 3/2014 |
| JP | 5627721 B2 | | 11/2014 |
| WO | 2013/061829 A1 | | 5/2013 |
| WO | 2014/118871 A1 | | 8/2014 |

OTHER PUBLICATIONS

Kido et al, Finned Heat Exchanger, Aug. 6, 1990, JPH02197796A, Whole Document.*
Mochizuki et al., Operation Controller for Air Conditioner, Aug. 3, 2001, JP2001208393A, Whole Document.*
Berner, Air Dehumidification Apparatus, Jun. 1, 1994, GB2272845A, Whole Document.*
Xicai, High Temperature Special Air Conditioner, Oct. 1, 2008, CN201126243Y, Whole Document (Year: 2008).*
Office Action dated Aug. 18, 2016 in the corresponding CN application No. 201380075911.4 (with English translation).
Japanese Office Action dated Jun. 7, 2016 in the corresponding JP application No. 2015-513421(English translation attached).
Office Action dated Mar. 22, 2016 in the corresponding Australian patent application No. 2013387944.
Office Action dated Oct. 15, 2015 in the corresponding TW application No. 102127401 (with English translation).
Extended European Search Report dated Nov. 3, 2016 issued in the corresponding EP application No. 13883034.4.
International Search Report of the International Searching Authority dated Aug. 6, 2013 for the corresponding international application No. PCT/JP2013/062128 (and English translation).
Examination Report dated Sep. 27, 2018 issued in corresponding IN patent application No. 6974/CHENP/2015.

* cited by examiner (a)          (b)          (c)

(a)  (b)

DEW CONDENSATION STAGNATING
ON BOTTOM PORTION

AMOUNT OF DEW CONDENSATION
STAGNATING ON BOTTOM PORTION

FIN PITCH

DEHUMIDIFIER

CROSS REFERENCE TO RELATED APPLICATION

This application is a U.S. national stage application of PCT/JP2013/062128 filed on Apr. 24, 2013, the content of which is incorporated herein by reference.

TECHNICAL FIELD

The present invention relates to a dehumidifier.

BACKGROUND

Hitherto, there has been known an example of Patent Literature 1 as a dehumidifier for dehumidifying space to be dehumidified through adsorption and desorption by a desiccant material for adsorbing and desorbing moisture. Patent Literature 1 relates to a technology of performing dehumidification while combining cooling and heating by a heat exchanger in a refrigeration cycle and adsorption and desorption by a desiccant rotor. The dehumidifier in Patent Literature 1 has an air passage for causing air in the space to be dehumidified to sequentially flow through a radiator in the refrigeration cycle, a desorption portion of the desiccant rotor, an evaporator in the refrigeration cycle, and an adsorption portion of the desiccant rotor.

The air, which has been taken from the space to be dehumidified into the air passage, is heated in the radiator. The heated air is humidified in the desorption portion of the desiccant rotor. The humidified air is cooled down to a dew-point temperature or less in the evaporator to be cooled and dehumidified. The cooled and dehumidified air is further dehumidified in the adsorption portion of the desiccant rotor, and then is returned to the space to be dehumidified. Further, a dehumidifying operation is continuously performed by rotating the desiccant rotor.

PATENT LITERATURE

Patent Literature 1: Japanese Unexamined Patent Application Publication No. 2006-1 50305 (Abstract, FIG. 1)

In the above-mentioned related-art apparatus, adsorption and desorption actions of the desiccant material and cooling and heating actions of the refrigeration cycle are combined with each other so that a larger dehumidifying amount can be realized than in a case of dehumidification using only the refrigeration cycle or the desiccant material, thereby providing a dehumidifier having high performance. On the other hand, the above-mentioned related-art apparatus, however, has the following problems.

The desiccant rotor is used, and hence a drive unit for the rotor is necessary. Further, it is necessary to provide a sealing structure for separating boundary portions of the adsorption portion and the desorption portion of the desiccant rotor in an air-tight manner to prevent air leakage between the adsorption portion and the desorption portion, thus leading to a problem in increase in size of the apparatus and cost. Further, an air-passage structure in which the air having passed through the desiccant rotor is again returned to the desiccant rotor is employed, and hence the air-passage structure has a large number of curved portions, thus leading to a problem in that a pressure loss at the time of sending the air is increased so that power of a fan is increased to increase power consumption of the apparatus.

SUMMARY

The present invention has been made to solve the above-mentioned problems, and has an object to realize a dehumidifier that is capable of simplifying the apparatus while keeping high dehumidification performance by eliminating the need for a desiccant-rotor drive unit or a sealing structure for boundary portions of an adsorption portion and a desorption portion to attain compactification and low cost.

The present invention provides a dehumidifier including a refrigerant circuit configured to circulate refrigerant and sequentially connecting a compressor, a flow switching device, a first heat exchanger, a pressure reducing unit, and a second heat exchanger to each other by refrigerant pipes, an air passage in which the first heat exchanger, a desiccant material capable of adsorbing and desorbing moisture, and the second heat exchanger are arranged in series, and an air-sending device arranged in the air passage and configured to cause air existing in space to be dehumidified to flow through the air passage. Each of the first heat exchanger and the second heat exchanger has a plurality of fins arranged in parallel at an interval from one another so that air passes between the plurality of fins. The dehumidifier is configured to perform a dehumidifying operation including a first operation mode in which the first heat exchanger is operated as a condensor or a radiator and the second heat exchanger is operated as an evaporator to desorb the moisture retained in the desiccant material, and a second operation mode in which the first heat exchanger is operated as the evaporator and the second heat exchanger is operated as the condensor or the radiator to cause the desiccant material to adsorb moisture from air passing through the air passage. The first operation mode and the second operation mode are alternately switched through switching of a flow passage by the flow switching device.

According to the present invention, the adsorption and desorption actions of the desiccant material and the heating and cooling actions obtained through performance of the refrigeration cycle in the refrigerant circuit are combined with each other so that dehumidification of a high dehumidifying amount can be performed. In addition, an air-passage structure in which the first heat exchanger, the desiccant material, and the second heat exchanger are arranged in series is employed. Further, the dehumidification is performed by alternately switching the first operation mode and the second operation mode through the switching of the flow passage by the flow switching device. In the first operation mode, the first heat exchanger is operated as the condensor or the radiator and the second heat exchanger is operated as the evaporator to desorb the moisture retained in the desiccant material. In the second operation mode, the first heat exchanger is operated as the evaporator and the second heat exchanger is operated as the condensor or the radiator to cause the desiccant material to adsorb the moisture from the air passing through the air passage. Consequently, the apparatus structure can be further simplified to provide an apparatus that is more compact and low cost. Further, the interval between the fin surfaces in each of the first heat exchanger and the second heat exchanger is secured to be 1.5 mm to 3.0 mm so that drainage performance for dew condensation on the fin surfaces can be enhanced, with the result that dehumidification performance of the dehumidifier can be enhanced.

BRIEF DESCRIPTION OF DRAWINGS

FIG. 4 is schematic views each illustrating a configuration of each of first and second heat exchangers, in which FIG. 4(a) illustrates a case of Embodiment 1, and FIG. 4(b) and FIG. 4(c) illustrate comparative examples.

FIG. 8 is explanatory views illustrating a positional difference of grooves in fin surfaces depending on a function required for the grooves, in which FIG. 8(a) illustrates positions of grooves formed for the purpose of increasing the heat transfer area, and FIG. 8(b) illustrates positions of grooves according to Embodiment 1, which are formed for the purpose of increasing drainage performance.

FIG. 14 is explanatory views of respective configuration examples of the first heat exchanger and the second heat exchanger in FIG. 1, in which FIG. 14(a) is a schematic plan view of the first heat exchanger, and FIG. 14(b) is a schematic plan view of the second heat exchanger. Further, the dotted arrows in FIG. 14 indicate a flow direction of air.

DETAILED DESCRIPTION

Embodiment 1

Figure 1:
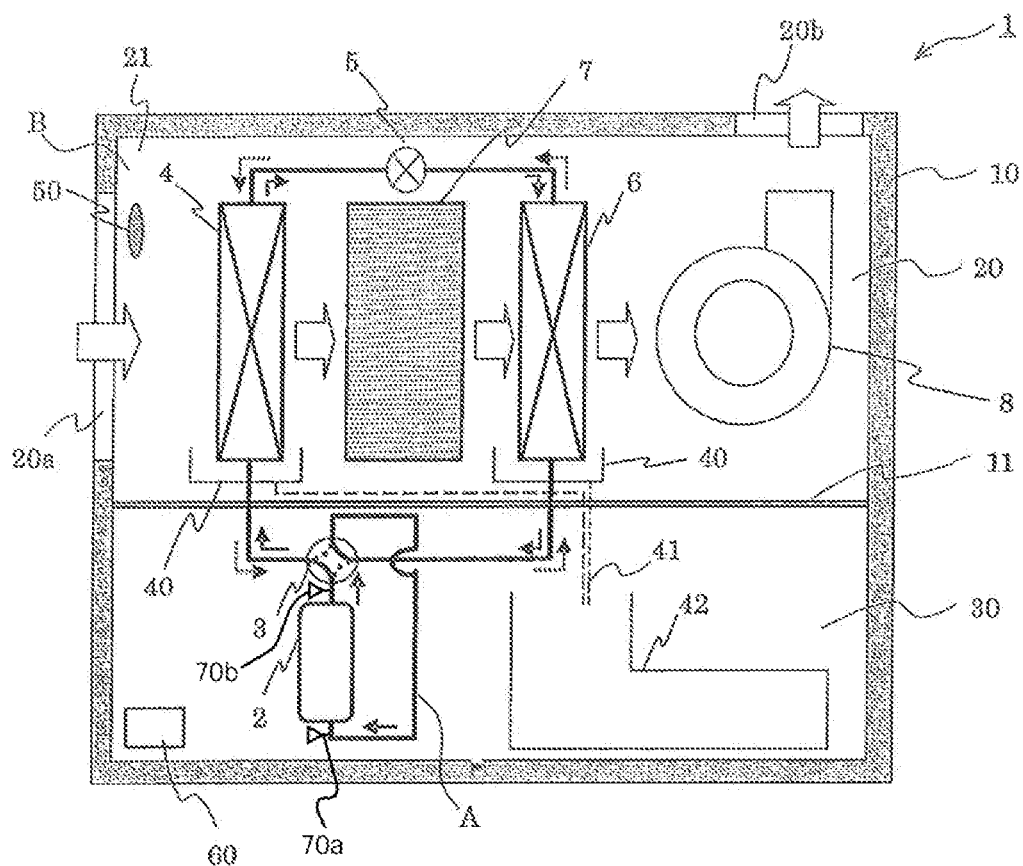
FIG. 1 is a diagram illustrating a configuration of a dehumidifier according to Embodiment 1 of the present invention.

FIG. 1 is a diagram illustrating a configuration of a dehumidifier according to Embodiment 1 of the present invention. In FIG. 1 and each drawing described later, components denoted by the same reference signs correspond to the same or equivalent components. This is common throughout the description herein. Further, the forms of the components described herein are merely examples, and the components are not limited to those described herein.

A dehumidifier 1 includes, in a housing 10, a compressor 2, a four-way valve 3 serving as a flow switching device, a first heat exchanger 4, an expansion valve 5 serving as a pressure reducing unit, and a second heat exchanger 6. These components are annularly connected to each other by refrigerant pipes to construct a refrigerant circuit A. An inside of the housing 10 is partitioned into an air passage chamber 20 and a machine chamber 30. The compressor 2 and the four-way valve 3 are arranged in the machine chamber 30, and components other than the compressor 2 and the four-way valve 3 are arranged in the air passage chamber 20. Note that, through holes (not shown) are formed in a wall surface 11 partitioning the machine chamber 30 and the air passage chamber 20, and the refrigerant pipes are inserted through the through holes (not shown) so that the respective components are connected to each other. Further, to prevent generation of an air flow between the machine chamber 30 and the air passage chamber 20 through gaps between the through holes and the connection pipes, it is preferred that no gap portions be formed to maintain air tightness.

The four-way valve 3 is configured to switch a flow passage so that refrigerant flows in a direction of the solid lines in FIG. 1 or a direction of the dotted lines in FIG. 1. When the flow passage is switched to a flow passage indicated by the solid lines in FIG. 1, a refrigeration cycle is constructed that the refrigerant, which is discharged from the compressor 2, sequentially flows through the four-way valve 3, the first heat exchanger 4, the expansion valve 5, the second heat exchanger 6, and the four-way valve 3 to return to the compressor 2. In this configuration, the first heat exchanger 4 is operated as a condensor (radiator), and the second heat exchanger 6 is operated as an evaporator.

On the other hand, when the flow passage of the four-way valve 3 is switched to a flow passage indicated by the dotted lines in FIG. 1, a refrigeration cycle is constructed that the refrigerant, which is discharged from the compressor 2, sequentially flows through the compressor 2, the four-way valve 3, the second heat exchanger 6, the expansion valve 5, the first heat exchanger 4, and the four-way valve 3 to return to the compressor 2. In this configuration, the second heat exchanger 6 is operated as the condensor (radiator), and the first heat exchanger 4 is operated as the evaporator. As the refrigerant for the dehumidifier 1, for example, R410A is used. Note that, the refrigerant is not limited to R410A, another HFC-based refrigerant, a HC refrigerant, or a natural refrigerant such as $CO_2$ or $NH_3$ can be used. When the $CO_2$ refrigerant is used in an operation with a high pressure being a critical pressure or more, the condensor is operated as the radiator.

The first heat exchanger 4 and the second heat exchanger 6 are each a plate fin tube heat exchanger, and are each configured to exchange heat between refrigerant flowing in a heat transfer tube and air flowing around plate fins (hereinafter simply referred to as "fins").

A structure of the fins of each of the first heat exchanger 4 and the second heat exchanger 6 is described later. The fins are formed placing a priority on drainage performance (slidability) for dew condensation on fin surfaces. Specifically, the fins each have a configuration having no slits or projecting portions for enhancing a leading edge effect.

The expansion valve 5 is a valve fixed in its opening degree, and is configured to reduce a pressure of refrigerant passing therethrough to be expanded.

The air passage chamber 20 includes an air inlet 20a for introducing air to be dehumidified to an inside, and an air outlet 20b for exhausting the dehumidified air to an outside. The air, which is sent by a fan 8 serving as an air-sending device, flows in a direction of the outline arrows in FIG. 1. The air passage chamber 20 is formed into a rectangular shape. The air passage chamber 20 has formed therein an air passage B in which the first heat exchanger 4, a desiccant block 7 serving as a desiccant material, the second heat exchanger 6, and the fan 8 are arranged in series. Therefore, the air, which is sucked from the air inlet 20a into the air passage B, flows linearly through the air passage B in the order of the first heat exchanger 4, the desiccant block 7 serving as the desiccant material, the second heat exchanger 6, and the fan 8, and is then exhausted from the air outlet 20b to the outside of the dehumidifier 1.

The desiccant block 7 is obtained by forming a desiccant material into a solid in a rectangular shape. The desiccant block 7 is formed of a material that adsorbs and desorbs moisture, and, for example, zeolite, silica gel, or polymer-based adsorbent is used.

Further, in the air passage chamber 20, a drain pan 40 is arranged below each of the first heat exchanger 4 and the second heat exchanger 6. The drain pan 40 receives drain water that is generated during the operation and drops from each heat exchanger. The drain water, which is received in the drain pan 40, flows through a water passage 41 indicated by the dotted lines in FIG. 1 into a drain tank 42, which is arranged in a lowermost portion in the dehumidifier 1, to be stored.

The air passage chamber 20 further includes a temperature-humidity sensor 50 for measuring a temperature and a humidity of air sucked into the dehumidifier 1 (temperature and humidity around the dehumidifier 1).

Further, the dehumidifier 1 further includes a controller 60 on the machine chamber 30 side, for controlling the entire dehumidifier 1. The controller 60 is constructed by a microcomputer, and includes a CPU, a RAM, and a ROM. A control program is stored in the ROM. The controller 60 performs various types of control such as control of a dehumidifying operation (such as switching of the four-way valve 3 in accordance with a detection signal of the temperature-humidity sensor 50) described later, control of the rotation speed of the fan 8, control of the rotation speed of the compressor 2, and control of the opening degree of the expansion valve 5.

Next, the dehumidifying operation performance of the dehumidifier 1 is described. In the dehumidifier 1, two operation modes are realized through switching of the flow passage by the four-way valve 3. Each of the operation modes is hereinafter described in order.

(First Operation Mode: Performance of Refrigeration Cycle)

First, performance of the first operation mode, which corresponds to a case where the flow passage of the four-way valve 3 is switched to the solid lines in FIG. 1, is described. The performance of the refrigeration cycle in the first operation mode is as follows. A low-pressure gas is sucked by the compressor 2, and is then compressed into a high-temperature and high-pressure gas. The refrigerant discharged by the compressor 2 passes through the four-way valve 3 into the first heat exchanger 4. The refrigerant that flows into the first heat exchanger 4 rejects heat to air flowing in the air passage B, and the refrigerant itself is cooled while heating the air to be condensed into high-pressure liquid refrigerant and flows out of the first heat exchanger 4. The liquid refrigerant that flows out of the first heat exchanger 4 is reduced in pressure into low-pressure two-phase refrigerant by the expansion valve 5. After that, the refrigerant flows into the second heat exchanger 6 and takes away heat from the air flowing in the air passage B, and the refrigerant itself is heated while cooling the air to be evaporated into a low-pressure gas. After that, the refrigerant passes through the four-way valve 3 and is sucked into the compressor 2.

(First Operation Mode: Performance of Air)

Figure 2:
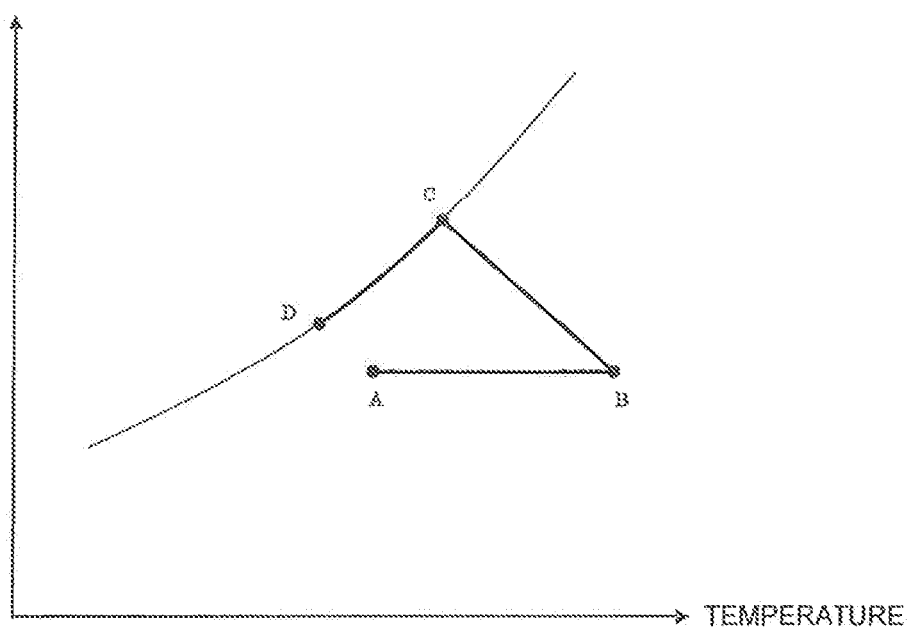
FIG. 2 is a psychrometric chart illustrating state change of air in a first operation mode.

Next, performance of air in the first operation mode is described referring to FIG. 2. FIG. 2 is a psychrometric chart illustrating state change of the air in the first operation mode. The vertical axis represents an absolute humidity of the air, and the horizontal axis represents a dry-bulb temperature of the air. Further, the curved line in FIG. 2 represents saturated air, and a relative humidity of the saturated air is 100%.

After flowing into the dehumidifier 1, the air around the dehumidifier 1 (FIG. 2, point A) is heated in the first heat exchanger 4 so that a temperature thereof is increased and a relative humidity thereof is decreased (FIG. 2, point B). After that, the air flows into the desiccant block 7. The relative humidity of the air is low, and hence moisture retained in the desiccant block 7 is desorbed (released) so that an amount of moisture contained in the air is increased. On the other hand, desorption heat is taken due to the desorption from the air that flows into the desiccant block 7 so that the temperature of the air is decreased to be brought into a low-temperature and high-humidity state (FIG. 2, point C). After that, the air flows into the second heat exchanger 6 and is cooled. Note that, the refrigerant circuit A is operated so that a refrigerant temperature in the second heat exchanger 6 is lower than a dew-point temperature of the air, and the air is cooled and dehumidified by the second heat exchanger 6 to be brought into a low-temperature and low-absolute humidity state (FIG. 2, point D). After that, the air flows into the fan 8 and is exhausted from the air outlet 20b to the outside of the dehumidifier 1.

(Second Operation Mode: Performance of Refrigeration Cycle)

Next, performance of the second operation mode, which corresponds to a case where the flow passage of the four-way valve 3 is switched to the dotted lines in FIG. 1, is described. The performance of the refrigeration cycle in the second operation mode is as follows. A low-pressure gas is sucked by the compressor 2, and is then compressed into a high-temperature and high-pressure gas. The refrigerant discharged by the compressor 2 passes through the four-way valve 3 into the second heat exchanger 6. The refrigerant that flows into the second heat exchanger 6 rejects heat to air flowing in the air passage B, and the refrigerant itself is cooled while heating the air to be condensed into high-pressure liquid refrigerant and flows out of the second heat exchanger 6. The liquid refrigerant that flows out of the second heat exchanger 6 is reduced in pressure into low-pressure two-phase refrigerant by the expansion valve 5. After that, the refrigerant flows into the first heat exchanger 4 and takes away heat from the air flowing in the air passage B, and the refrigerant itself is heated while cooling the air to be evaporated into a low-pressure gas. After that, the refrigerant passes through the four-way valve 3 and is sucked into the compressor 2.

(Second Operation Mode: Performance of Air)

Figure 3:
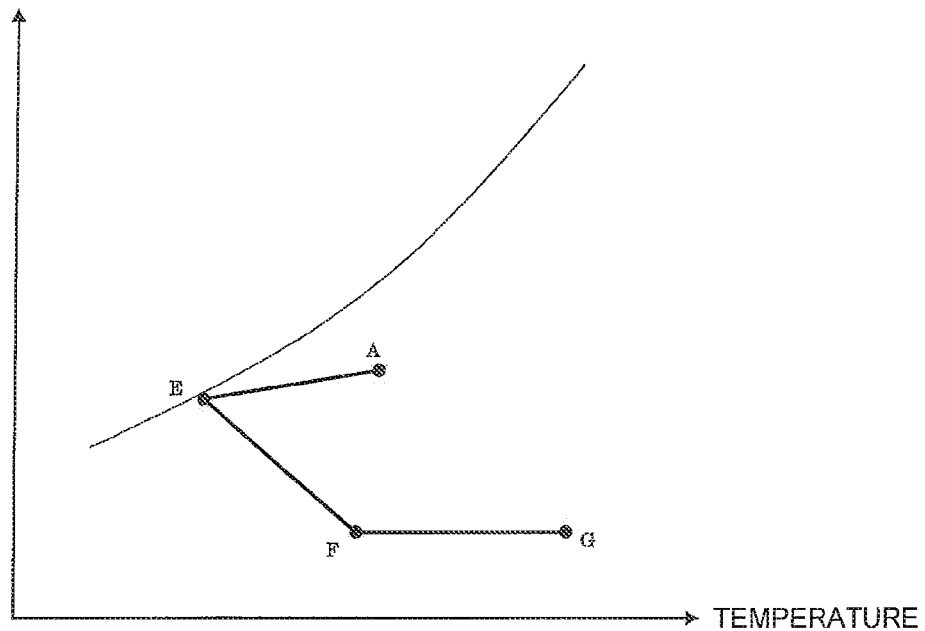
FIG. 3 is a psychrometric chart illustrating state change of air in a second operation mode.

Next, performance of air in the second operation mode is described referring to FIG. 3. FIG. 3 is a psychrometric chart illustrating state change of the air in the second operation mode. The vertical axis represents an absolute humidity of the air, and the horizontal axis represents a dry-bulb temperature of the air. Further, the curved line in FIG. 3 represents saturated air, and a relative humidity of the saturated air is 100%.

After flowing into the dehumidifier 1, the air around the dehumidifier 1 (FIG. 3, point A) is cooled in the first heat exchanger 4. Note that, the refrigerant circuit A is operated so that a refrigerant temperature in the first heat exchanger 4 is lower than the dew-point temperature of the air, and the air is cooled and dehumidified by the first heat exchanger 4 to be brought into a low-temperature and high-relative humidity state (FIG. 3, point E). After that, the air flows into the desiccant block 7. The relative humidity of the air is high, and hence moisture is adsorbed into the desiccant block 7 so that an amount of moisture contained in the air is decreased to be further dehumidified. On the other hand, the air that flows into the desiccant block 7 is heated by adsorption heat generated along with the adsorption so that the temperature of the air is increased to be brought into a high-temperature and low-humidity state (FIG. 3, point F). After that, the air flows into the second heat exchanger 6 and is heated to increase its temperature (FIG. 3, point G). After that, the air flows into the fan 8 and is exhausted from the air outlet 20b to the outside of the dehumidifier 1.

As described above, in the first operation mode, the dehumidification by the adsorption of the desiccant block 7 is performed in addition to the dehumidification by the cooling by the refrigerant in the first heat exchanger 4. Therefore, as apparent from comparison between FIG. 2 and FIG. 3, a larger dehumidifying amount can be secured in the second operation mode than that in the first operation mode, and hence the dehumidification in the dehumidifier 1 is mainly performed in the second operation mode.

In the dehumidifier 1 according to Embodiment 1, the first and second operation modes are alternately repeated. For example, when the second operation mode is performed continuously, because there is a limit to the amount of the moisture containable in the desiccant block 7, through an operation for a certain time period, the moisture is not adsorbed into the desiccant block 7 anymore, thereby decreasing the dehumidifying amount. To address the problem, in a stage in which the amount of the moisture retained in the desiccant block 7 is closer to the upper limit, the second operation mode is switched to the first operation mode, and an operation of releasing the moisture from the desiccant block 7 is performed. The first operation mode is performed for a while, and the amount of the moisture retained in the desiccant block 7 is moderately reduced. At this time point, the first operation mode is switched to the second operation mode again. As described above, the first and second operation modes are performed alternately so that the adsorption and desorption actions of the desiccant block 7 are performed sequentially, thereby maintaining an effect of increasing the dehumidifying amount due to the adsorption and desorption actions of the desiccant.

The fins of each of the first heat exchanger 4 and the second heat exchanger 6 according to Embodiment 1 are formed placing a priority on the drainage performance rather than heat transfer performance. The configuration and effects obtained by the configuration are described below.

Figure 4:
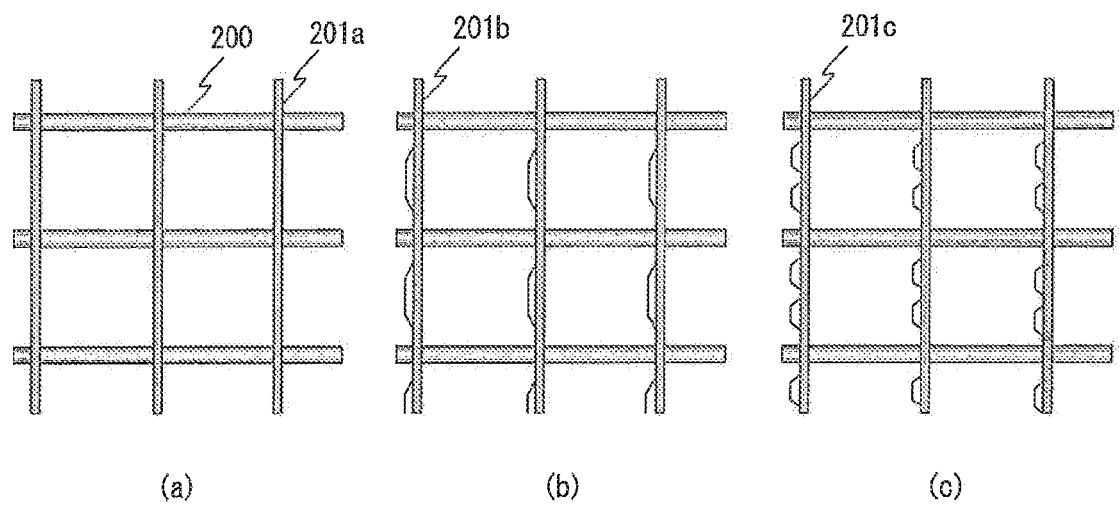

FIG. 4 is schematic views each illustrating a configuration of each of the first and second heat exchangers, in which FIG. 4(a) illustrates a case of Embodiment 1, and FIG. 4(b) and FIG. 4(c) illustrate comparative examples. Note that, in FIG. 4, a direction orthogonal to the drawing sheet corresponds to an air passing direction.

As illustrated in FIG. 4(a), a heat exchanger constructing each of the first and second heat exchangers includes a plurality of smooth fins 201a arranged side by side, and a plurality of heat transfer tubes 200 passing through the plurality of fins 201a. The plurality of heat transfer tubes 200 are arranged in a plurality of rows in a row direction perpendicular to the air passing direction (vertical direction in FIG. 4), and in one or a plurality of columns in the air passing direction.

Hitherto, in the heat exchanger, through enhancement in heat transfer performance, cooling performance is increased to increase the dehumidifying amount. As a typical measure therefor, there is given a process of forming cut and raised portions, such as slits, on the fin surfaces in FIG. 4(b) and fins 201c in FIG. 4(c) so that the leading edge effect can be obtained as in fins 201b.

Further, when forming the cut and raised portions on the fin surface, various shape are conceivable in consideration of balance between heat transfer from the heat transfer tubes 200 and the leading edge effect on the fin, such as a shape of forming large cut and raised portions (FIG. 4(b), 201b), and a shape of forming a plurality of small cut and raised portions (FIG. 4(c), 201c).

Figure 5:
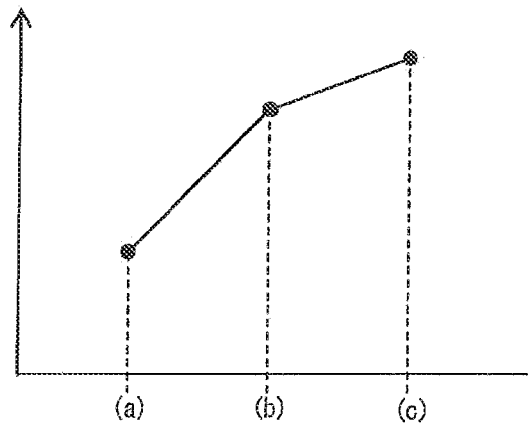
FIG. 5 is a graph for comparing heat transfer coefficients between heat exchangers in FIG. 4(a) to FIG. 4(c).
Figure 6:
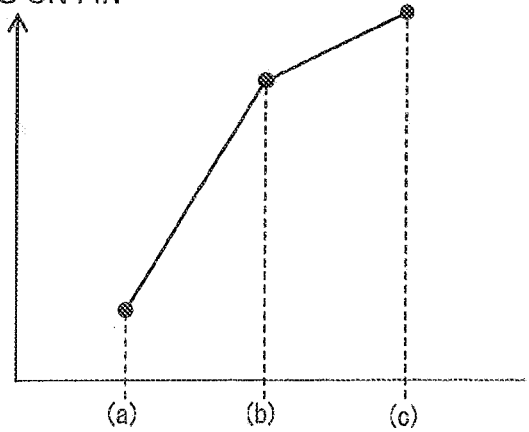
FIG. 6 is a graph for comparing amounts of dew condensation stagnating on a fin between the heat exchangers in FIG. 4(a) to FIG. 4(c).

FIG. 5 is a graph for comparing heat transfer coefficients between the heat exchangers in FIG. 4(a) to FIG. 4(c). FIG. 6 is a graph for comparing amounts of dew condensation stagnating on the fin between the heat exchangers in FIG. 4(a) to FIG. 4(c).

In general, heat transfer efficiency per unit area is higher in the heat exchangers having a larger number of cut and raised portions on the fins as shown in FIG. 5. Therefore, the fin area of the heat exchanger is reduced by using the fins 201b or 201c having the cut and raised portions formed thereon to attain compactification.

However, in the dehumidifier 1 according to Embodiment 1, the first operation mode and the second operation mode are performed, and when the mode is switched, heating and cooling are switched between the first heat exchanger 4 and the second heat exchanger 6. The dew condensation adheres on the fin surfaces that function as a cooling unit immediately before the switching. The fin surfaces are heated when operated as the condensor or the radiator after the switching of the mode, and hence the dew condensation is not collected as drain and is evaporated into the air again. When the dew condensation is evaporated again as described above, a humidity of space to be dehumidified, which is once dehumidified, is increased again, thus leading to dehumidification loss. Therefore, it is required to reduce an amount of the dew condensation in the evaporator to reduce an amount of the re-evaporation.

The amount of the re-evaporation from the fins at this time greatly differs depending on the amount of the dew condensation stagnating on the fin surfaces. In particular, when the fin surfaces each have the cut and raised portions, a plurality of narrow portions (opening portions) are on each of the fin surfaces so that the dew condensation easily stagnates thereon. As the number of the cut and raised portions is larger, the amount of the stagnating dew condensation is increased. As a result, as shown in FIG. 6, the amount of the stagnating dew condensation is the smallest in the smooth fins (FIG. 4(a), 201a), and is the largest in the fins (FIG. 4(c), 201c) having a larger number of cut and raised portions.

Figure 7:
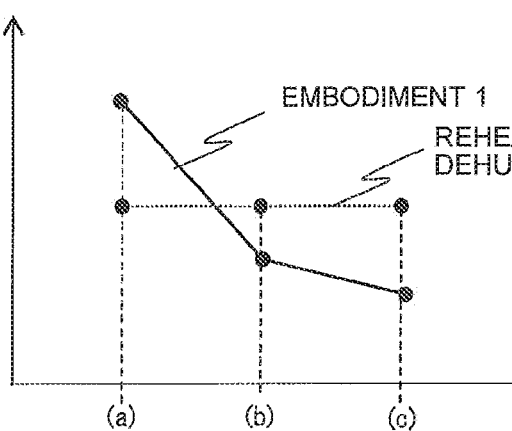
FIG. 7 is a graph for comparing dehumidifying amounts in the heat exchangers in which the fins in FIG. 4(a) to FIG. 4(c) are used and sizes of the fins are changed so that the heat exchangers each have equivalent cooling performance.

FIG. 7 is a graph for comparing the dehumidifying amounts in the heat exchangers in which the fins in FIG. 4(a) to FIG. 4(c) are used and sizes of the fins are changed so that the heat exchangers each have equivalent cooling performance.

In a dehumidifier that is not switched in function of the heat exchanger as in the related-art reheat dehumidification system (system of dehumidifying sucked air in the evaporator, and then warming the air excessively decreased in its temperature in the condenser), the dehumidifying amount is not changed depending on a type of the fins (dotted lines in FIG. 7). However, in the dehumidifier 1 according to Embodiment 1, as the fins 201a are smoother, dehumidification performance is more excellent as a result (solid lines in FIG. 7).

Further, it is preferred that the amount of the dew condensation generated on the fin surfaces be smaller, and hence the fin surfaces are subjected to hydrophilic treatment to reduce contact angles of droplets of the dew condensation, thereby reducing the stagnation amount.

Further, shapes leading to enhancement in drainage performance (fine grooves) are provided on the surfaces of the fins 201a so that drainage performance is enhanced to reduce the amount of the dew condensation on the fins 201a, with the result that the dehumidifying amount in the dehumidifier 1 can be increased.

Figure 8:
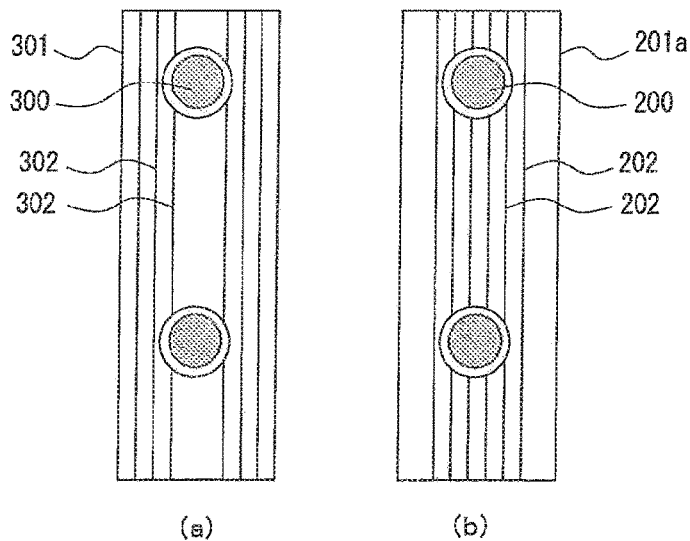

FIG. 8 is explanatory views illustrating a positional difference of grooves in the fin surfaces depending on a function required for the grooves, in which FIG. 8(*a*) illustrates positions of grooves formed for the purpose of increasing the heat transfer area, and FIG. 8(*b*) illustrates positions of grooves according to Embodiment 1, which are formed for the purpose of increasing the drainage performance.

Hitherto, the grooves may be formed in the surfaces of the fins for the purpose of increasing the heat transfer area of the fins. In this case, as illustrated in FIG. 8(*a*), grooves 302 are arranged on a fin 301 at positions away from heat transfer tubes 300. As in Embodiment 1, when grooves 202 are formed for the purpose of enhancing the drainage performance on the fin 201a, as illustrated in FIG. 8(*b*), the grooves 202 are arranged in the vicinities of the heat transfer tubes 200 around which a generation amount of dew condensation is large. Through the arrangement of the grooves 202 at these positions, the drainage performance on the fin 201a can be enhanced.

Further, through formation of nano-order fine pores (not shown) not passing through the fin 201a in the surface of the fin 201a, the slidability of water droplets can be increased due to air layers in the fine pores.

Figure 9:
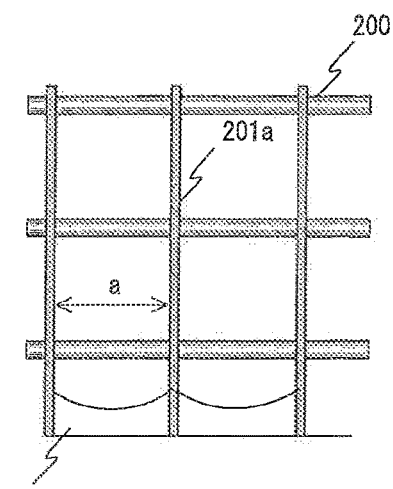
FIG. 9 is an explanatory view of the dew condensation stagnating on a bottom portion between the fins.
Figure 10:
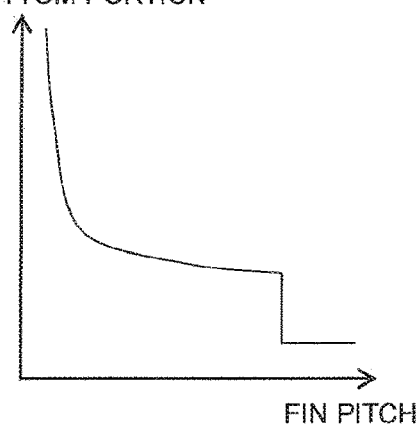
FIG. 10 is a graph showing a relationship between a fin pitch and an amount of the dew condensation stagnating on the bottom portion.
Figure 11:
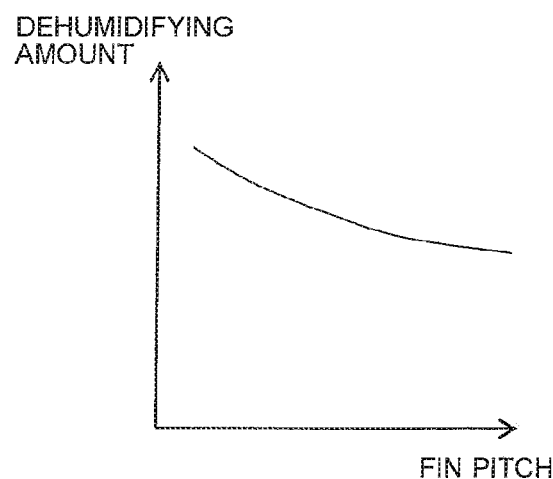
FIG. 11 is a graph showing a relationship between the fin pitch and a dehumidifying amount in a heat exchanger having the same volume out of consideration of the stagnating dew condensation.

FIG. 9 is an explanatory view of the dew condensation stagnating on a bottom portion between the fins. FIG. 10 is a graph showing a relationship between a fin pitch and an amount of the dew condensation stagnating on the bottom portion. FIG. 11 is a graph showing a relationship between the fin pitch and the dehumidifying amount in a heat exchanger having the same volume out of consideration of the stagnating dew condensation.

In a lower portion of each of the first heat exchanger 4 and the second heat exchanger 6 according to Embodiment 1, as illustrated in FIG. 9, the dew condensation stagnates on the bottom portion due to the surface tension of the moisture. Similarity to the dew condensation remaining on the fin surface at the time of switching the mode, the stagnating dew condensation is evaporated again to cause decrease in dehumidifying amount. Therefore, reduction in amount of the dew condensation stagnating on the bottom portion leads to increase in dehumidification performance.

A height of the dew condensation stagnating on the bottom portion of the heat exchanger depends on a distance between the fins (fin pitch) (a in FIG. 9). As shown in FIG. 10, as the fin pitch is narrower, the height of the dew condensation is increased, and also the amount of the stagnating dew condensation is increased. The fin pitch and the height of the stagnating dew condensation have a relationship of inverse proportion based on a relational formula in surface tension (Laplace formula), and as the fin pitch is narrower, the amount of the stagnating dew condensation is increased. Further, when the fin pitch is increased to a certain pitch, the dew condensation does not stagnate on the bottom portion anymore, thereby significantly decreasing the amount of the stagnating dew condensation.

However, the increase in fin pitch corresponds to decrease in number of the fins per volume of the heat exchanger, and thus a heat exchange amount is decreased to decrease efficiency of the refrigeration cycle. When the heat exchange amount is decreased as described above, as shown in FIG. 11, the dehumidifying amount of the dehumidifier 1 out of consideration of the stagnating dew condensation is decreased along with the increase in fin pitch.

Further, through the increase in size of the heat exchanger, the stagnating dew condensation can be reduced to some extent. However, in an apparatus configuration with the fin pitch leading to significant decrease in stagnating dew condensation, the heat exchange amount is decreased significantly, and hence the apparatus configuration is not practical.

Figure 12:
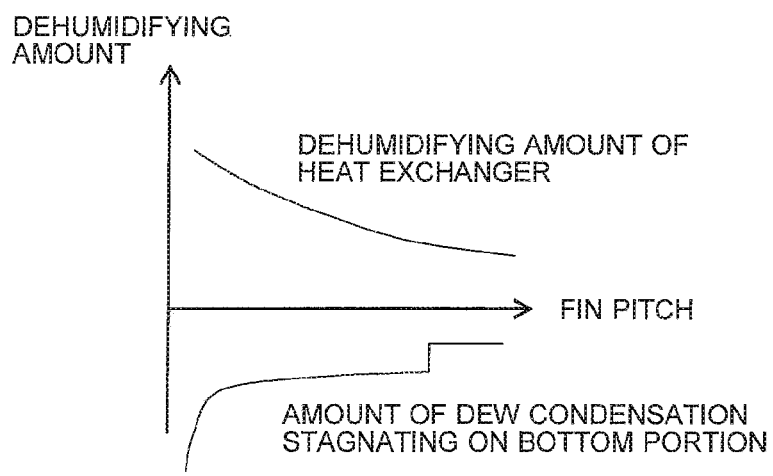
FIG. 12 is a graph showing a relationship between the dehumidifying amount of the heat exchanger, the amount of the stagnating dew condensation, and the fin pitch in the dehumidifier according to Embodiment 1 of the present invention.
Figure 13:
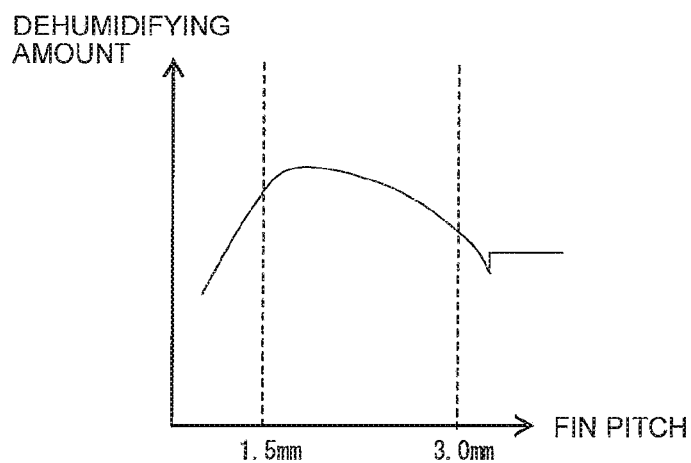
FIG. 13 is a graph showing a relationship between the fin pitch and the dehumidifying amount in the dehumidifier according to Embodiment 1 of the present invention.

FIG. 12 is a graph showing a relationship between the dehumidifying amount of the heat exchanger, the amount of the stagnating dew condensation, and the fin pitch in the dehumidifier according to Embodiment 1 of the present invention. In FIG. 12, the amount of the dew condensation stagnating on the bottom portion is shown as a minus amount. FIG. 13 is a graph showing a relationship between the fin pitch and the dehumidifying amount in the dehumidifier according to Embodiment 1 of the present invention. FIG. 13 corresponds to a graph combining two relational formulas shown in FIG. 12. In FIG. 13, the horizontal axis represents the fin pitch, and the vertical axis represents the dehumidifying amount of the dehumidifier, which is obtained by adding the dehumidifying amount in FIG. 11 and the amount of the dew condensation stagnating on the bottom portion (minus amount) in FIG. 10 (dehumidifying amount collectable as drain).

Assuming that all the dew condensation stagnating on the bottom portion is re-evaporated (amount corresponding to the dehumidification loss), the dehumidifying amount collectable as drain accounts for a sum of the dehumidifying amount in FIG. 11 and the amount of the dew condensation stagnating on the bottom portion (minus amount) in FIG. 10, that is, accounts for the dehumidifying amount shown in FIG. 13.

As apparent from FIG. 13, a fin pitch that maximizes the dehumidifying amount varies depending on a purpose. In general, the fin pitch in the dehumidifier is from about 1.0 mm to about 3.0 mm. Comparing a case of a fin pitch of 1.0 mm and a case of a fin pitch of 1.5 mm, an amount of the dew condensation stagnating on the bottom portion in the case of 1.0 mm is about 1.5 times as large as that in the case of 1.5 mm, and in the case of the fin pitch of 1.0 mm, the dehumidifying amount is decreased (case where the surface tension is set to 0.07275 N/m and the contact angle is set to 0 degrees). In Embodiment 1, the distance between the fins is set to 1.5 mm to 3.0 mm so that the dew condensation stagnating in the lower portion of the heat exchanger can be reduced to increase the dehumidifying amount.

As described above, in Embodiment 1, the air passage B is formed linearly to construct a dehumidifier 1 having high performance, in which the adsorption and desorption actions of the desiccant material and the heating and cooling actions of the refrigeration cycle are combined with each other. The related-art apparatus has a configuration using a desiccant rotor, and hence it is required to cause air to pass through an adsorption portion and a desorption portion of the desiccant rotor. Thus, it is inevitable to form an air passage having a curved portion, and a pressure loss at the time of sending the air is correspondingly increased. In contrast, in Embodiment 1, the air passage B is formed linearly, and hence the pressure loss at the time of sending the air can be reduced.

Therefore, power consumption of the fan 8 for sending air can be correspondingly reduced to obtain a more highly efficient apparatus.

In the configuration using the desiccant rotor in the related art, a motor for rotationally driving the desiccant rotor, a fixing structure therefor, and the like are necessary, thereby complicating an apparatus configuration. In contrast, in Embodiment 1, the desiccant block 7 is stationary. Thus, the motor for rotationally driving the desiccant material is unnecessary, and further, the air passage configuration is simple. Therefore, compactification can be achieved, and the apparatus configuration can be simplified to provide a low-cost apparatus.

Further, in Embodiment 1, the air passage B is formed into a rectangular shape. Therefore, when each of the first heat exchanger 4, the second heat exchanger 6, and the desiccant block 7, which are to be mounted in the air passage B, is formed to have a rectangular outer-shape structure in conformity with the shape of the air passage B, each of the components can be mounted in the rectangular air passage B in higher density.

That is, in the related-art apparatus, the desiccant rotor is used, and hence the circular rotor is arranged in the rectangular air passage B. Therefore, dead space is generated in each of four corners in a rotor arrangement portion, and hence the air passage cannot be formed compact. In contrast, in Embodiment 1, the rectangular desiccant block 7 is used, and hence can be arranged without the dead space, thereby achieving mounting in high density. As a result, the air passage B can be formed compact (the air passage chamber 20 can be formed compact).

Further, in the related-art apparatus, the air passage needs to be divided for each of the adsorption portion and the desorption portion, thereby requiring a sealing structure for separating boundary portions of the adsorption portion and the desorption portion in an air-tight manner. In contrast, in Embodiment 1, the single air passage B is formed, and through the switching of the four-way valve 3, the adsorption and the desorption of the desiccant block 7 can be switched. Thus, the sealing structure in the related art is unnecessary, and the apparatus configuration can be simplified to achieve cost reduction.

Note that, when each of the first heat exchanger 4, the second heat exchanger 6, and the desiccant block 7, which are to be mounted in the air passage B, is formed to have the structure with the rectangular outer shape in conformity with the shape of the air passage B as described above, an effect of the compactification can be obtained as described above, and hence the structure with the rectangular outer shape is preferred. However, the shape of the structure is not necessarily limited to the rectangular shape.

Further, in the second operation mode in this embodiment, the sent air is subject to the heating by the second heat exchanger 6 subsequently to the dehumidification by the first heat exchanger 4 and the dehumidification by the desiccant block 7. Therefore, the air blown from the dehumidifier 1 is high in temperature with a small amount of moisture (FIG. 3, point G), and a relative humidity thereof can be decreased to a low relative humidity of, for example, 20% or less. The air having the low relative humidity as described above is air suitable for drying use, and when the air is directly blown onto an object to be dried such as a laundry, drying of the object to be dried can be promoted, thereby realizing a drying function having higher performance.

Further, in each of the first heat exchanger 4 and the second heat exchanger 6 according to Embodiment 1, an interval between the fin surfaces is secured to be 1.5 mm to 3.0 mm to smooth the fin surfaces, thereby increasing the drainage performance for the dew condensation on the fin surfaces. Therefore, at the time of switching the mode, the amount of the re-evaporation of the dew condensation can be reduced, with the result that the dehumidification performance of the dehumidifier can be increased. Further, the fin surfaces are formed into a shape having no openings passing therethrough, in other words, the cut and raised portions and the like are not formed on the fin surfaces, so that an effect of reduction in amount of the re-evaporation of the dew condensation can further be increased.

Further, with the hydrophilic treatment for enhancing the drainage performance on the fins 201a or the formation of the fine grooves or the fine pores for draining the dew condensation adhering on the fin surfaces in a gravity direction, the effect of the reduction in amount of the re-evaporation of the dew condensation can still further be increased.

Further, when the first operation mode is switched to the second operation mode, an amount of cooling and dehumidification for dehumidifying air to be dehumidified and an amount of humidification for humidifying low-humidity air adsorbed by the desiccant block 7 can be reduced.

Further, in the first operation mode, the air to be dehumidified is heated and then caused to flow into the desiccant block 7 so that a moisture releasing rate of the desiccant block 7 can be increased. Therefore, a time period during which a desorption action of the desiccant block 7 is not exerted can be shortened, with the result that the dehumidifying amount collectable as drain can be increased.

Note that, the blown air in the first operation mode is lower in temperature and higher in humidity than the blown air in the second operation mode, and hence, when using the dehumidifier 1 to dry the object to be dried, it is desired that the blown air be blown onto the object to be dried only in the second operation mode. Therefore, to correspond to such use, vanes changeable in air blowing direction may be arranged in the air outlet 20b of the dehumidifier 1 to achieve a configuration adjustable between a blowing direction in the first operation mode and a blowing direction in the second operation mode that are different from each other. Further, the vanes only need to be adjusted so that the air blown from the air outlet 20b is blown onto the object to be dried only in the second operation mode. Consequently, the drying of the object to be dried can further be promoted, thereby realizing a drying function having high performance.

Note that, the dehumidifier according to the present invention is not limited to the above-mentioned configuration, and various modifications may be made without departing from the gist of the present invention as follows, for example.

MODIFICATION EXAMPLE 1

Components of Dehumidifier 1

In FIG. 1, the configuration using the four-way valve 3 to switch the refrigerant circuit A is illustrated. However, as long as a configuration capable of switching the flow passage in the refrigerant circuit A is used, the configuration is not limited to the one using the four-way valve, and another valve may be used. For example, there may be employed a configuration in which four two-way solenoid valves are used, and the solenoid valves are respectively arranged in portions connecting between a discharge side of the compressor 2 and the first heat exchanger 4 and a suction side of the compressor 2 and the first heat exchanger 4. In this manner, through opening and closing of each of the solenoid valves, a refrigerant circuit A and a refrigeration cycle, which are similar to those in this embodiment, may be realized. Further, various pressure reducing units are conceivable as the expansion valve 5, such as an electronic expansion valve that is variably controllable in its opening degree, a capillary tube, and a thermal expansion valve.

MODIFICATION EXAMPLE 2

Operation Time Period of Each of Operation Modes

An operation time period of each of the first operation mode and the second operation mode may be a preset time period. However, the operation time period of each of the operation modes has an appropriate value in accordance with a condition of air or an operation state of the dehumidifier 1. Therefore, the operation time period of each of the operation modes may be determined based on the condition of air or the operation state of the dehumidifier 1 so that the dehumidifier 1 can be operated at the appropriate value.

In the first operation mode, the moisture is released from the desiccant block 7, and hence the appropriate value corresponds to a time period required to release a moderate amount of the moisture from the desiccant block 7 so that an amount of the moisture that remains in the desiccant block 7 becomes an appropriate amount. When the first operation mode is ended and switched to the second operation mode in a state in which the amount of the moisture that remains in the desiccant block 7 is larger than the appropriate amount, an amount of the moisture that can be adsorbed by the desiccant block 7 in the second operation mode is suppressed to reduce the dehumidifying amount in the second operation mode. In contrast, when the first operation mode is performed for an excessively long period of time, a state in which the moisture is hardly desorbed from the desiccant block 7 continues in a latter stage in the first operation mode, and hence the switching to the second operation mode that realizes the higher dehumidifying amount than that in the first operation mode is delayed. Therefore, the dehumidifying amount in total is reduced also in this case.

In the second operation mode, the moisture is adsorbed into the desiccant block 7, and hence an appropriate value corresponds to a time period until an amount of the moisture adsorbed into the desiccant block 7 becomes an appropriate amount. When the operation is switched to the first operation mode even when the desiccant block 7 still has room to adsorb the moisture, the operation time period of the second operation mode having the higher dehumidifying amount than the first operation mode is shortened so that the dehumidifying amount is reduced in total. In contrast, when the second operation mode is performed for an excessively long period of time, a state in which the desiccant block 7 cannot adsorb the moisture continues in a latter stage in the second operation mode, and hence the dehumidifying amount is reduced also in this case.

The change in amount of the moisture retained in the desiccant block 7 is determined in accordance with a relative humidity of air flowing into the desiccant block 7, and when air having a high relative humidity flows into the desiccant block 7, the moisture in the desiccant block 7 is less easily released to increase an amount of the adsorbed moisture contrarily. Further, when the air having the low relative humidity flows into the desiccant block 7, the moisture in the desiccant block 7 is easily released to reduce the amount of the adsorbed moisture contrarily.

In view of the above-mentioned matters, the operation time period of each of the operation modes may be determined by Determination Method 1 or Determination Method 2 below. Incidentally, during the dehumidifying operation, the first operation mode and the second operation mode are performed as one cycle, and this cycle is performed repeatedly. A time period of the one cycle (that is, a total time period of the operation time period of the first operation mode and the operation time period of the second operation mode) is always the same. Therefore, the determination methods described below in a sense determine a time distribution in the one cycle between the first operation mode and the second operation mode. Note that, the determination of each operation time period is made at the start of the dehumidifying operation. Each determination pattern is described below in order.

(Determination Method 1)

A relative humidity of the sucked air is determined based on a state of the sucked air, which is obtained by the temperature-humidity sensor 50, and then the operation time period of each of the operation modes is determined in accordance with the relative humidity. Specific description is given below.

A relative humidity of the sucked air, which serves as a reference (hereinafter referred to as "reference relative humidity"), is predetermined, and a reference operation time period of each of the operation modes that a high dehumidifying amount can be obtained when sucked air having the reference relative humidity passes through the air passage B is predetermined through experiments, simulation, or the like. Then, the reference operation time period of each of the operation modes is increased or decreased as appropriate as described below in accordance with a magnitude relationship between an actual relative humidity of the sucked air and the reference relative humidity, to thereby determine the operation time period of each of the operation modes.

The actual relative humidity of the sucked air is determined based on the state of the sucked air, which is obtained by the temperature-humidity sensor 50 at the start of the dehumidifying operation. When the relative humidity is higher than a preset relative humidity, an amount of the moisture released from the desiccant block 7 in the first operation mode is smaller than an amount of the moisture released therefrom when the relative humidity is equal to the reference relative humidity. Further, an amount of the moisture adsorbed into the desiccant block 7 in the second operation mode is larger than an amount of the moisture adsorbed thereinto when the relative humidity is equal to the reference relative humidity. Therefore, when the actual relative humidity of the sucked air is higher than the reference relative humidity, the operation time period of the first operation mode is set longer than the reference operation time period of the first operation mode, and in contrast, the operation time period of the second operation mode is set shorter than the reference operation time period of the second operation mode.

On the other hand, when the actual relative humidity of the sucked air is lower than the reference relative humidity, the amount of the moisture released from the desiccant block 7 in the first operation mode is larger than the amount of the moisture released therefrom when the relative humidity is equal to the reference relative humidity. Further, the amount of the moisture adsorbed into the desiccant block 7 in the second operation mode is smaller than the amount of the moisture adsorbed thereinto when the relative humidity is equal to the reference relative humidity. Therefore, when the actual relative humidity of the sucked air is lower than the reference relative humidity, the operation time period of the first operation mode is set shorter than the reference operation time period of the first operation mode, and in contrast, the operation time period of the second operation mode is set longer than the reference operation time period of the second operation mode.

Through the adjustment of the operation time period in each of the operation modes as described above, the amount of the moisture retained in the desiccant block 7 can appropriately be controlled, and regardless of the state of the sucked air, the high dehumidifying amount can always be realized. Note that, when the actual relative humidity of the sucked air is equal to the reference relative humidity, as a matter of course, the dehumidifier 1 only needs to be operated for the reference operation time period of each of the operation modes.

(Determination Method 2)

The operation time period of each of the operation modes is determined based on an operation state of the refrigerant circuit A at the start of the dehumidifying operation. Specific description is given below.

The operation state of the refrigerant circuit A fluctuates depending on the state of the sucked air. Specifically, when the relative humidity of the sucked air is high, a humidity difference between air before passing through the heat exchanger serving as the evaporator in each of the operation modes and air after passing therethrough is increased as compared to a case where the relative humidity of the sucked air is low. That is, heat exchange between refrigerant and air in the evaporator is promoted, and accordingly, an operation is performed in which a low-pressure-side pressure in the refrigeration cycle is increased. In contrast, when the relative humidity of the sucked air is low, the heat exchange between the refrigerant and the air in the evaporator is suppressed, and hence an operation is performed in which the low-pressure-side pressure in the refrigeration cycle is decreased.

The low-pressure-side pressure in the refrigeration cycle and the relative humidity of the sucked air have the above-mentioned relationship. Thus, through application of this relationship to Determination Method 1 described above, the operation time period of each of the first and second operation modes can be determined in accordance with the low-pressure-side pressure in the refrigeration cycle. Note that, a high-pressure-side pressure in the refrigeration cycle is also increased along with the increase in low-pressure-side pressure, and after all, the operation time period of each of the first operation mode and the second operation mode can be determined in accordance with the low-pressure-side pressure or the high-pressure-side pressure in the refrigeration cycle.

That is, the low-pressure-side pressure (or high-pressure-side pressure) in the refrigeration cycle is measured at the start of the dehumidifying operation, and a measured low-pressure value (or measured high-pressure value) obtained through the measurement and a preset low-pressure reference value (or high-pressure reference value) are compared with each other. When the measured low-pressure value (or measured high-pressure value) is higher than the low-pressure reference value (or high-pressure reference value), it is determined that the relative humidity of the sucked air is high. Similarly to Determination Method 1 described above, the operation time period of the first operation mode is set longer than the reference operation time period, and in contrast, the operation time period of the second operation mode is set shorter than the reference operation time period.

On the other hand, when the measured low-pressure value (or measured high-pressure value) is lower than the low-pressure reference value (or high-pressure reference value), it is determined that the relative humidity of the sucked air is low. Similarly to Determination Method 1 described above, the operation time period of the first operation mode is set shorter than the reference operation time period, and in contrast, the operation time period of the second operation mode is set longer than the reference operation time period.

Figure 15:
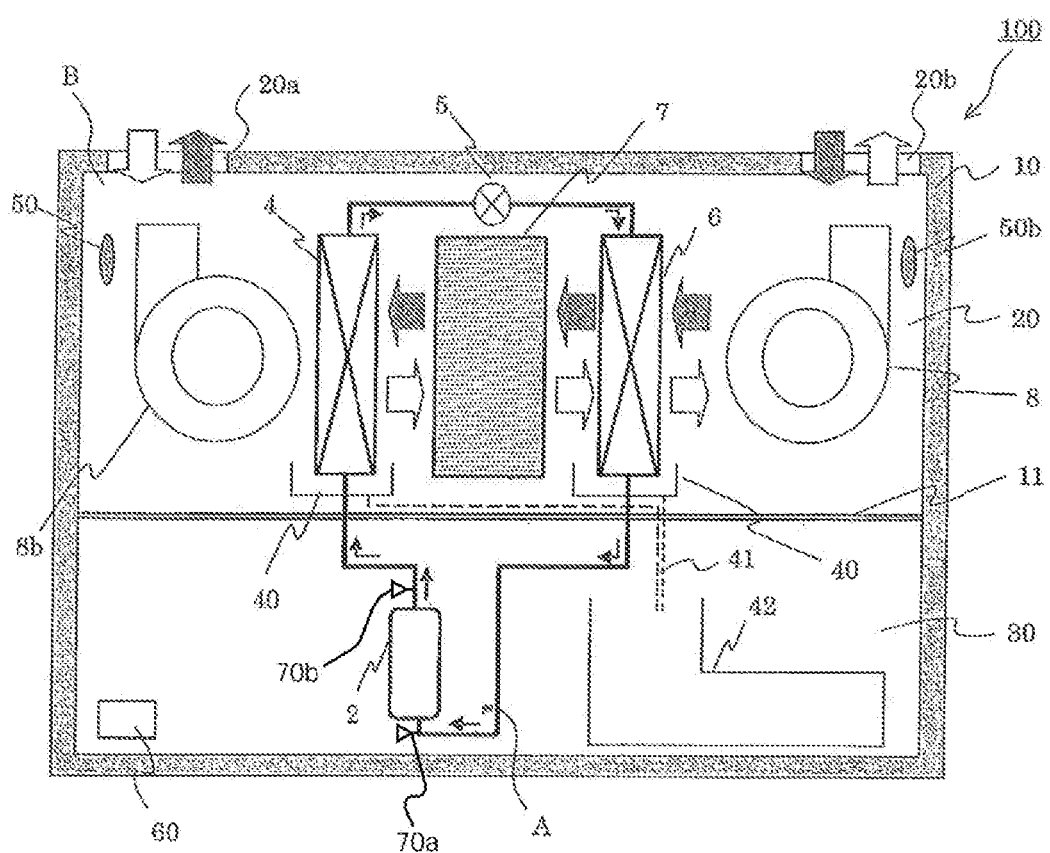
FIG. 15 is a diagram illustrating a configuration of a dehumidifier according to Embodiment 2 of the present invention.

Note that, when the low-pressure-side pressure and the high-pressure-side pressure are measured, the pressures may be measured by pressure sensors 70a, 70b provided to a low-pressure portion 70a and a high-pressure portion 70b of the refrigeration cycle, or a temperature of refrigerant in each heat exchanger, which serves as a gas-liquid two-phase portion in the 15 refrigeration cycle, may be measured to estimate the low-pressure-side pressure based on the temperature, as shown in FIGS. 1 and 15.

As described above, the amount of the moisture retained in the desiccant block 7 can appropriately be controlled also based on the low-pressure-side pressure and the high-pressure-side pressure in the refrigeration cycle similarly to Determination Method 1 described above (method based on information of the sucked air). The high dehumidifying amount can always be realized regardless of the state of the sucked air.

(Switching of Operation at Time of Frost Formation)

Incidentally, when the second operation mode is performed with sucked air having a low temperature, the first heat exchanger 4 cools low-temperature air. Therefore, when a temperature of fin surfaces in the first heat exchanger 4 becomes 0 degrees C. or less, frost is formed on the fin surfaces. When the operation is continued in the state as it is, the formed frost grows to block air flow passages between the fins. As a result, an air-sending amount is decreased, and thus the operation of the dehumidifier 1 cannot properly be performed.

In view of the above, when it is estimated that frost is formed in the first heat exchanger 4 based on the operation state of the refrigerant circuit A during the second operation mode, even before an end of a preset operation time period (or before an end of an operation time period determined in Determination Method 1 or Determination Method 2 described above), the second operation mode may be ended and switched to the first operation mode. Note that, in the first operation mode, the first heat exchanger 4 is operated as the condensor, and hence the refrigerant is high in pressure and temperature so that the formed frost can be heated to be melted.

A frost-formation state can be determined based on the low-pressure-side pressure in the refrigeration cycle. For example, when a time during which the low-pressure-side pressure is lower than a predetermined value is continued for a certain time period during the operation in the second operation mode, it is determined that a state in which the temperature of the fin surfaces of the first heat exchanger 4 is 0 degrees C. or less is continued for a long time period, and the frost formation is progressed. In this case, as described above, the second operation mode is ended and switched to the first operation mode. Note that, as a measurement method for the low-pressure-side pressure, similarly to the above-mentioned measure, the pressure sensor 70a may be provided to the low-pressure portion of the refrigeration cycle, or the temperature of the refrigerant in the first heat exchanger 4, which is low in pressure and serves as the gas-liquid two-phase portion, may be measured.

Note that, the determination for the frost-formation state is not limited to the above-mentioned method. The temperature itself of the fin surfaces of the first heat exchanger 4 may be measured, and when the operation is continued for a certain time period at the temperature of 0 degrees C. or less, the state may be determined as the frost-formation state.

As described above, when the determination as the frost-formation state is made in the second operation mode, through the switching to the first operation mode, the dehumidifier 1 is not operated with the frost-formation state being progressed anymore, thereby realizing a more reliable dehumidifier 1 that avoids the decrease in dehumidifying amount caused by the decrease in air-sending amount.

In the above, the frost formation in the first heat exchanger 4 in the second operation mode is described. However, the frost may also be formed in the second heat exchanger 6 in the first operation mode. It is known that moisture adsorption and desorption rates of the desiccant block 7 during the adsorption and during the desorption fluctuate depending on a temperature. In general, as the temperature is increased, moisture adsorption and releasing rates are increased. In Embodiment 1 according to the present invention, the temperature of the air flowing into the desiccant block 7 in the first operation mode is higher than that in the second operation mode, and hence the operation time period of the first operation mode is shorter than the operation time period of the second operation mode. That is, an amount of the frost formed in the first operation mode is smaller than an amount of the frost formed in the second operation mode in many cases.

An enthalpy of the air flowing into the second heat exchanger 6 that functions as the evaporator in the first operation mode is larger than an enthalpy of the air flowing into the first heat exchanger 4 that functions as the evaporator in the second operation mode, and as a result of comparison in a case where the same heat exchange amount is secured, a required heat transfer area may be smaller in the second heat exchanger 6. That is, the air flowing into the second heat exchanger 6 is higher in temperature and humidity than the air flowing into the first heat exchanger 4 in the second operation mode, and hence, even when the heat transfer area of the second heat exchanger 6 is smaller than that in the first heat exchanger 4, the dehumidifying amount can be secured.

The amount of the dew condensation stagnating on the bottom portion greatly varies also depending on the number of columns in the heat exchanger as well as the fin pitch. As the number of columns is increased, the amount of the dew condensation stagnating on the bottom portion is also increased. In view of these matters, the first heat exchanger 4 and the second heat exchanger 6 may be configured as in FIG. 14 below.

Figure 14:
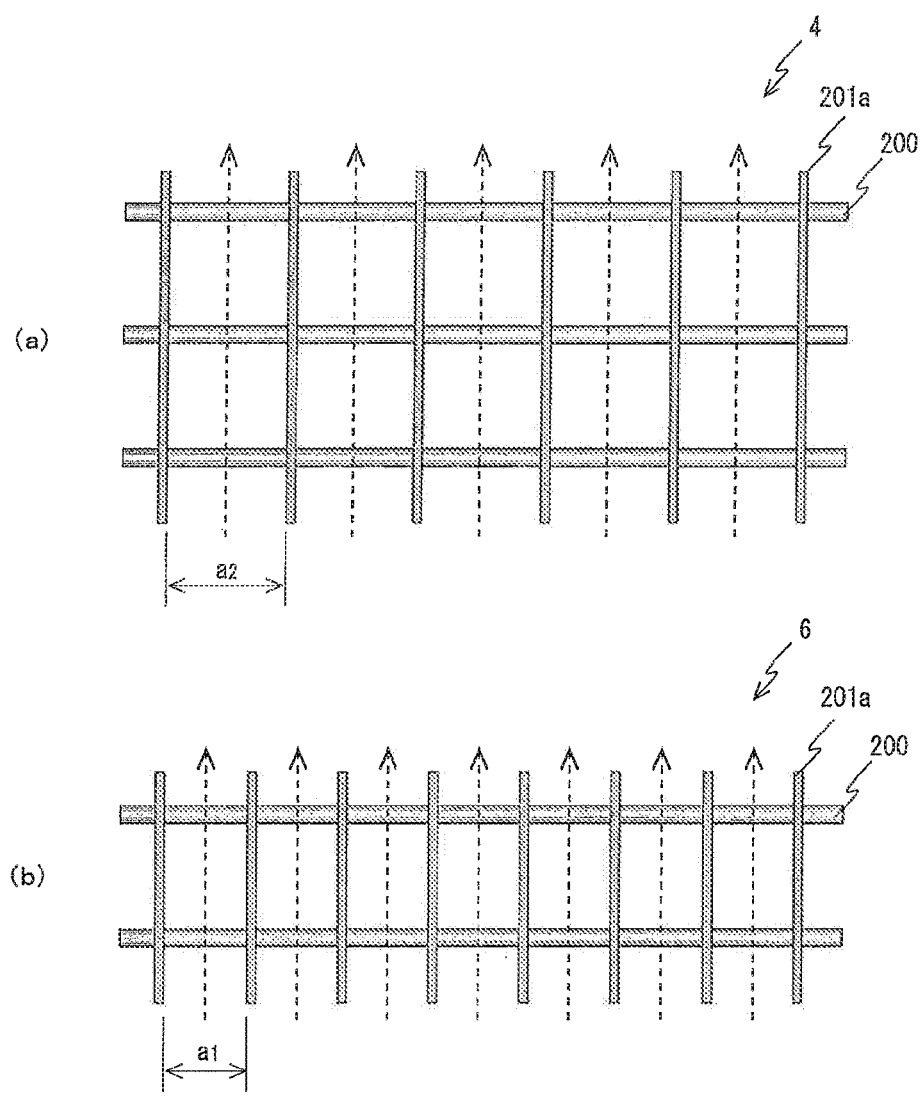

FIG. 14 is explanatory views of respective configuration examples of the first heat exchanger and the second heat exchanger in FIG. 1, in which FIG. 14(a) is a schematic plan view of the first heat exchanger, and FIG. 14(b) is a schematic plan view of the second heat exchanger. Further, the dotted arrows in FIG. 14 indicate the air passing direction.

In the second heat exchanger 6, as described above, even when the heat transfer area is small, the dehumidifying amount can be secured. Thus, placing a priority on the reduction in amount of the dew condensation stagnating on the bottom portion, the number of columns (number of the air passing directions) is set smaller than that in the first heat exchanger 4 so that a fin pitch a1 is set to be narrower than a fin pitch a2 in the first heat exchanger 4. With this configuration, the amount of the dew condensation stagnating on the bottom portion in the second heat exchanger 6 in the first operation mode can be reduced so that the dehumidifying amount can significantly be increased.

As the refrigerant for the dehumidifier 1, as described above, besides R410A, another HFC-based refrigerant, HC refrigerant, or natural refrigerant such as $CO_2$ or $NH_3$ can be used. As the refrigerant for the dehumidifier 1, besides these refrigerants, R32 having a higher gas specific heat ratio than that of R410A may also be used. When R32 is used as the refrigerant, heating capacity when the refrigerant is used as a hot gas for defrosting can be enhanced so that frost and ice formed in the first heat exchanger 4 or the second heat exchanger 6 can be melted in an early stage. Note that, the above-mentioned effects can be obtained not only in the case where R32 is used as the refrigerant, but, for example, also in the case where a refrigerant mixture of R32 and HFO123yf having a higher gas specific heat ratio than that of R410A is used, the heating capacity when the refrigerant is used as the hot gas can similarly be enhanced so that the frost and the ice formed in the first heat exchanger 4 or the second heat exchanger 6 can be melted in an early stage.

Further, when R32 is used as the refrigerant, the defrosting for the formed frost can be ended in an early stage so that desorption reaction of the air flowing into the desiccant block 7 in the first operation mode can be started in an early stage. Therefore, a rate of a time during which the dehumidifying amount is increased can be increased, and hence an operation time period required to reach a target dehumidifying amount is shortened, thereby attaining energy saving.

Embodiment 2

FIG. 15 is a diagram illustrating a configuration of a dehumidifier according to Embodiment 2 of the present invention. Embodiment 2 is described below mainly on points different from Embodiment 1. Note that, the modification examples applied to the same components in Embodiment 1 are also similarly applied in Embodiment 2.

A dehumidifier 100 according to Embodiment 2 has a configuration in which the four-way valve 3 is eliminated from the dehumidifier 1 according to Embodiment 1 illustrated in FIG. 1, and a flow direction of the refrigerant in the refrigerant circuit A is limited to a direction of the solid arrows in FIG. 15. Further, a fan 8b is arranged between the air inlet 20a and the first heat exchanger 4. Note that, in Embodiment 2, the air inlet 20a serves as an air inlet/outlet 20a through which the air is not only sucked but also blown, and the air outlet 20b serves as an air inlet/outlet 20b through which the air is not only blown but also sucked. The dehumidifier 100 further includes a temperature-humidity sensor 50b for measuring a temperature and a humidity of the air flowing into the dehumidifier 100 from the air inlet/outlet 20b (temperature and humidity around the dehumidifier 100). However, one of the temperature-humidity sensor 50 and the temperature-humidity sensor 50b may be provided. In short, the temperature and the humidity of the air sucked into the dehumidifier 100 only need to be detected.

The fan 8 and the fan 8b are not operated simultaneously, and one of the fan 8 and the fan 8b is operated at one time. When the fan 8 is operated, similarly to FIG. 1, the air flows in a direction of the outline arrows in FIG. 15, which is directed from left to right (first direction), and when the fan 8b is operated, the air flows in a direction of the gray arrows in FIG. 15, which is directed from right to left (second direction). Note that, as an air-sending device for causing the air to flow in the direction of the outline arrows and the direction of the gray arrows, the two fans are illustrated. However, a single fan rotatable in a forward direction and a reverse direction may be provided.

In Embodiment 2, the first heat exchanger 4 is always operated as the condensor, and heats the air flowing thereinto. Further, the second heat exchanger 6 is always operated as the evaporator, and cools and dehumidifies the air flowing thereinto.

Next, operation performance in Embodiment 2 is described. In Embodiment 2, a dehumidifying operation includes a third operation mode in which the fan 8 is operated to cause the air to flow in the direction of the outline arrows, and a fourth operation mode in which the fan 8b is operated to cause the air to flow in the direction of the gray arrows, and the respective operation modes are switched to perform dehumidification. The third operation mode is the same operation as the first operation mode in Embodiment 1. In the third operation mode, the air flowing into the air passage B from the air inlet/outlet 20a is heated in the first heat exchanger 4 to have a low relative humidity, and then desorbs the moisture retained in the desiccant block 7. After that, the air flows into the second heat exchanger 6 and is cooled and dehumidified, and then is blown from the air inlet/outlet 20b to an outside of the dehumidifier 100.

On the other hand, in the fourth operation mode, the air flowing from the air inlet/outlet 20b into the air passage B is cooled and dehumidified in the second heat exchanger 6 to have a high relative humidity, and then moisture of the air is adsorbed into the desiccant block 7 to be further dehumidified. After that, the air is heated in the first heat exchanger 4, and is blown from the air inlet/outlet 20a to the outside of the dehumidifier 100. As described above, the fourth operation mode is different from Embodiment 1 in performance of the refrigeration cycle in the refrigerant circuit A. However, state change of the air in the air passage B is the same as that in the second operation mode in Embodiment 1.

In the dehumidifier 100 according to Embodiment 2, the third and fourth operation modes are alternately repeated. Consequently, the state change of the air in each of the desiccant block 7 and the dehumidifier 100 is the same as that in the case where the first and second operation modes are alternately performed in Embodiment 1.

In Embodiment 2, only the second heat exchanger 6 functions as the evaporator. Therefore, the configuration for increasing the drainage performance for the dew condensation, which is illustrated in Embodiment 1, that is, the point that the interval between the fin surfaces is set to 1.5 mm to 3.0 mm only needs to be applied to the second heat exchanger 6. Further, the point that the fin surfaces each have a shape having no openings, the point that the fine grooves or the fine pores are arranged in the fin surfaces, and the point that the fin surfaces are subjected to the hydrophilic treatment also similarly only need to be applied to the second heat exchanger 6.

Note that, in Embodiment 2, the problem in that moisture of the dew condensation, which adheres to the second heat exchanger 6, re-evaporates is not caused unlike Embodiment 1. However, it is effective to enhance drainage performance in the second heat exchanger 6 in enhancing the dehumidification performance of the dehumidifier 1. That is, when the dew condensation is generated on the fin surfaces of the second heat exchanger 6, the dew condensation on the fin surfaces of the second heat exchanger 6 may flow into the desiccant block 7 at the time of switching from the third operation mode to the fourth operation mode. In this case, the amount of the moisture retained in the desiccant block 7 may be increased due to moisture other than moisture from the air to be dehumidified, which is originally required to be dehumidified, thus leading to decrease in performance in adsorption of moisture from the air to be dehumidified, and also leading to decrease of performance of the dehumidifier 1 as a result. Therefore, through the enhancement in drainage performance in the second heat exchanger 6, the dehumidification performance can be enhanced. Further, through the enhancement in drainage performance in the second heat exchanger 6, the frost formation in the second heat exchanger 6 can also be delayed. Also in this regard, it is effective to enhance the drainage performance in the second heat exchanger 6.

Note that, a determination method for an operation time period of each of the third and fourth operation modes is the same as that in Embodiment 1. That is, the operation time period of the third operation mode is determined in a manner similar to the operation time period of the first operation mode in Embodiment 1, and the operation time period of the fourth operation mode is determined in a manner similar to the operation time period of the second operation mode in Embodiment 1. Note that, a relative humidity of the sucked air at the start of the dehumidification may be determined based on a state of the sucked air, which is obtained by the temperature-humidity sensor 50 or the temperature-humidity sensor 50b.

As described above, according to Embodiment 2, the same effects as those of Embodiment 1 can be obtained. That is, it is possible to construct a dehumidifier 100 having high performance, in which the adsorption and desorption actions of the desiccant material and the cooling action of the refrigeration cycle are combined with each other. In addition, the air-passage structure can achieve high-density mounting and be simplified, and the apparatus can be formed compact and manufactured at low cost.

Note that, in Embodiment 1 or Embodiment 2, the relative humidity of the sucked air is determined based on the state of the sucked air, which is obtained by the temperature-humidity sensor 50 and the temperature-humidity sensor 50b. However, another sensing unit may be employed as long as the sensing unit is a device that can estimate the relative humidity. For example, a sensor for directly measuring the relative humidity or a unit for estimating the relative humidity based on a dew-point temperature measured by a sensor may be employed. The temperature-humidity sensor 50 and the temperature-humidity sensor 50b each function as a state-detection device of the present invention. Further, the detection sensors (e.g., pressure sensors 70a, 70b) used for measuring the low-pressure-side pressure and the high-pressure-side pressure each also correspond to the state-detection device of the present invention as described above.

The invention claimed is:

1. A dehumidifier, comprising:
   a refrigerant circuit configured to circulate refrigerant and sequentially connecting a compressor, a flow switching device, a first heat exchanger, a pressure reducing unit, and a second heat exchanger to each other by refrigerant pipes;
   a first state-detection device configured to detect an operation state of the refrigerant circuit;

an air passage in which the first heat exchanger, a desiccant material capable of adsorbing and desorbing moisture, and the second heat exchanger are arranged in series; and an air-sending device arranged in the air passage and configured to cause air existing in space to be dehumidified to flow through the air passage, each of the first heat exchanger and the second heat exchanger having a plurality of fins arranged in parallel at an interval from one another so that air passes between the plurality of fins, the dehumidifier being configured to perform a dehumidifying operation including a first operation mode in which the first heat exchanger is operated as a condenser or a radiator and the second heat exchanger is operated as an evaporator to desorb the moisture retained in the desiccant material, and a second operation mode in which the first heat exchanger is operated as the evaporator and the second heat exchanger is operated as the condenser or the radiator to cause the desiccant material to adsorb moisture from air passing through the air passage, the first operation mode and the second operation mode being alternately switched through switching of a flow passage by the flow switching device, wherein each of the first heat exchanger and the second heat exchanger has a configuration including the plurality of fins and a plurality of heat transfer tubes passing through the plurality of fins, in each of the first heat exchanger and the second heat exchanger, the plurality of heat transfer tubes are arranged in a plurality of rows in a row direction that is a direction perpendicular to an air passing direction and in a plurality of columns in the air passing direction, the first heat exchanger containing a number of columns of the plurality of columns of heat transfer tubes larger than a number of columns of the plurality of columns of heat transfer tubes in the second heat exchanger, and the interval arranged between the plurality of fins in the first heat exchanger is equal to or larger than the interval arranged between the plurality of fins in the second heat exchanger, and wherein an operation time period of the first operation mode and an operation time period of the second operation mode are each determined based on the operation state detected by the second state-detection device, wherein the first state-detection device is a device configured to detect a low-pressure-side pressure or a high-pressure-side pressure in the refrigerant circuit, wherein, when the low-pressure-side pressure or the high-pressure-side pressure detected by the first state-detection device at a start of the dehumidifying operation is higher than corresponding one of a predetermined low-pressure reference value and a predetermined high-pressure reference value, the operation time period of the first operation mode is set longer than a reference operation time period of the first operation mode, and the operation time period of the second operation mode is set shorter than a reference operation time period of the second operation mode, and wherein, when the low-pressure-side pressure or the high-pressure-side pressure detected by the first state-detection device at the start of the dehumidifying operation is lower than corresponding one of the predetermined low-pressure reference value and the predetermined high-pressure reference value, the operation time period of the first operation mode is set shorter than the reference operation time period of the first operation mode, and the operation time period of the second operation mode is set longer than the reference operation time period of the second operation mode.

2. The dehumidifier of claim 1, wherein each fin surfaces in each of the first heat exchanger and the second heat exchanger has a shape without openings.

3. The dehumidifier of claim 1, wherein each fin surfaces in each of the first heat exchanger and the second heat exchanger is provided with fine grooves thereon or fine pores thereon not passing through each of the plurality of fins and configured to drain dew condensation adhering on each of the fin surfaces in a gravity direction.

4. The dehumidifier of claim 1, wherein the refrigerant is refrigerant having a higher gas specific heat ratio than a gas specific heat ratio of R410A.

5. The dehumidifier of claim 1, further comprising a second state-detection device configured to detect a state of a sucked air sucked into the air passage from the space to be dehumidified, wherein an operation time period of the first operation mode and an operation time period of the second operation mode are each determined based on the state detected by the second state-detection device.

6. The dehumidifier of claim 5, wherein the second state-detection device is a device configured to detect a relative humidity, wherein a reference operation time period of the first operation mode and a reference operation time period of the second operation mode when a relative humidity of the sucked air is equal to a preset reference relative humidity are preset, wherein, when the relative humidity of the sucked air, which is detected by the second state-detection device at a start of the dehumidifying operation, is higher than the preset reference relative humidity, the operation time period of the first operation mode is set longer than the reference operation time period of the first operation mode, and the operation time period of the second operation mode is set shorter than the reference operation time period of the second operation mode, and wherein, when the relative humidity of the sucked air, which is detected by the second state-detection device at the start of the dehumidifying operation, is lower than the preset reference relative humidity, the operation time period of the first operation mode is set shorter than the reference operation time period of the first operation mode, and the operation time period of the second operation mode is set longer than the reference operation time period of the second operation mode.

7. The dehumidifier of claim 1, wherein the first operation mode and the second operation mode are switched every preset time period.

8. The dehumidifier of claim 1, further comprising a frost-formation detection device configured to detect frost formation in the first heat exchanger, wherein, when the frost formation is detected by the frost-formation detection device during the second operation mode, the second operation mode is switched to the first operation mode even before an original end time of an operation time period of the second operation mode.

9. The dehumidifier of claim 1, wherein the interval between fin surfaces of the plurality of fins is equal to or larger than 1.5 mm.

10. The dehumidifier of claim 1, wherein the interval between fin surfaces of the plurality of fins is equal to or smaller than 3.0 mm.

* * * * *